US012439909B1

(12) United States Patent
Webster

(10) Patent No.: US 12,439,909 B1
(45) Date of Patent: Oct. 14, 2025

(54) COMBINATION GARAGE DOOR SENSOR AND PEST REPELLENT DEVICE

(71) Applicant: Daren Webster, Hemet, CA (US)

(72) Inventor: Daren Webster, Hemet, CA (US)

( * ) Notice: Subject to any disclaimer, the term of this patent is extended or adjusted under 35 U.S.C. 154(b) by 0 days.

(21) Appl. No.: 19/057,824

(22) Filed: Feb. 19, 2025

(51) Int. Cl.
*A01M 29/30* (2011.01)
*A01M 29/18* (2011.01)
*G01V 8/12* (2006.01)

(52) U.S. Cl.
CPC ............ *A01M 29/30* (2013.01); *A01M 29/18* (2013.01); *G01V 8/12* (2013.01)

(58) Field of Classification Search
CPC ............................... A01M 29/18; A01M 29/30
USPC ......................................................... 367/139
See application file for complete search history.

(56) References Cited

U.S. PATENT DOCUMENTS

| | | | |
|---|---|---|---|
| 5,598,379 A | 1/1997 | Mallleolo | |
| 6,016,100 A * | 1/2000 | Boyd | A01M 31/002 340/573.2 |
| 8,737,170 B2 | 5/2014 | Kasper | |
| 10,149,460 B1 * | 12/2018 | Lill | A01K 29/005 |
| 2013/0077446 A1 * | 3/2013 | Kasper | A01M 29/18 367/139 |
| 2016/0110981 A1 * | 4/2016 | Chin | A01M 29/16 340/573.1 |
| 2016/0338337 A1 * | 11/2016 | Waldman | A01M 29/18 |
| 2018/0106092 A1 * | 4/2018 | Singh | E05F 15/74 |
| 2023/0309547 A1 * | 10/2023 | Randolph | G08B 3/10 367/139 |

* cited by examiner

*Primary Examiner* — Christopher D Hutchens
(74) *Attorney, Agent, or Firm* — Eric Karich; Karich & Associates

(57) ABSTRACT

A combination garage door sensor and pest repellent device for installation adjacent a garage door has a housing that operably mounts a laser or LED for detecting an obstruction at the garage door, and an ultrasonic wave generator for generating ultrasonic sound waves, the ultrasonic wave generator being mounted within or associated with the housing. A mounting mechanism mounts the housing adjacent to the garage door, so that the laser or LED is able to detect an obstruction near or under the garage door, and a power source powers garage door sensor. A control system is operably connected with the ultrasonic wave generator for performing the following steps: determining if the garage door has been opened; emitting the ultrasonic sound waves via the ultrasonic wave generator when the garage door is opened; and halting the ultrasonic sound waves when the garage door is closed.

8 Claims, 2 Drawing Sheets

COMBINATION GARAGE DOOR SENSOR AND PEST REPELLENT DEVICE

BACKGROUND OF THE INVENTION

Field of the Invention

This invention relates generally to pest repellent devices, and more particularly to an ultrasonic pest repellent device that is combined with a garage door sensor.

Description of Related Art

A common problem faced by homeowners is rat infestations, especially in a garage. It has been found that rats and other small animals slip into the garage when the garage door is opened.

The field of pest control employs a wide variety of devices and methods for killing or repelling pests, typically in the form of traps and poisons. One method is the emission of high-frequency soundwaves to deter pests. Hearing is a particularly essential tool for rats and mice to communicate with each other and navigate their environment, as they produce a variety of vocalizations, including squeaks, chirps, and ultrasonic calls, to convey messages to each other. While humans can typically hear sounds between 20 Hz and 20,000 Hz, rodents can detect sounds in the ultrasonic range of around 1,000 Hz to 90,000 Hz. One study published in the Journal of the Acoustical Society of America found that ultrasonic frequencies between 20k and 50k Hz were successful in repelling rats. Another study conducted by the Department of Electrical and Computer Engineering at the University of Alabama found that the rats were most repelled by frequencies between 32k and 48k Hz. Yet another study conducted by ABC Pest Control Services found that frequencies between 8k Hz and 12k Hz were effective in repelling rats. Other studies have concluded that other pests, including bugs, lepidoptera, birds, termites, and others are also repelled by high-frequency sound waves.

Kasper, U.S. Pat. No. 8,737,170 teaches an ultrasonic pest deterrent device adapted for use in greenhouses and gardens, comprising a printed circuit board, output signal transducer and a housing adapted to shroud the components of the assembly within its waterproof interior. The device comprises a ramp signal generator and voltage control oscillator adapted to sweep between a chosen set of switchable frequency pitch ranges and tones, a sweep stop for single tone testing, a confidence test button, a power switch and indicator light. The confident test button provides an audible tone within human hearing range to ensure the device is operational, while the power indicator light provides a visual means of verifying operation when the device is emitting signals in the ultrasonic range. A timing circuit disables or modulates the device from continuous operation, saving battery life and randomizing the output signal for increased pest annoyance and deterrence.

One issue with soundwave repellents is that it is possible for pests to become habituated to the emissions, if the sound is constant. Therefore, it is important that soundwaves are emitted at key moments to maintain optimal deterrence at a critical time.

The present invention utilizes garage door sensors, which are already located at the entrance to the garage, to transmit ultrasonic sound waves, and to only emit the soundwaves when the garage door is opened, startling the rodent or other pest, and providing optimum repelling ability right when the garage door is opened. The present invention addresses these concerns and provides further advantages as described in the following summary.

SUMMARY OF THE INVENTION

The present invention teaches certain benefits in construction and use which give rise to the objectives described below.

The present invention provides a combination garage door sensor and pest repellent device for installation adjacent a garage door. The combination comprises a garage door sensor having a housing that operably mounts a laser or LED for detecting an obstruction at the garage door, and an ultrasonic wave generator for generating ultrasonic sound waves, the ultrasonic wave generator being mounted within or associated with the housing. A mounting mechanism mounts the housing adjacent to the garage door, so that the laser or LED is able to detect an obstruction near or under the garage door, and a power source powers garage door sensor. A control system is operably connected with the ultrasonic wave generator for performing the following steps: determining if the garage door has been opened; emitting the ultrasonic sound waves via the ultrasonic wave generator when the garage door is opened; and halting the ultrasonic sound waves when the garage door is closed.

A primary objective of the present invention is to provide a combination garage door sensor and pest repellent device having advantages not taught by the prior art.

Another objective is to provide a combination garage door sensor and pest repellent device adapted to seamlessly integrate with existing garage door systems.

A further objective is to provide a combination garage door sensor and pest repellent device that generates ultrasonic sound waves to repel pests right when a garage door is opened, to startle pests away at the critical moment that they might otherwise slip into a garage.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a combination garage door sensor and pest repellent device for generating intermittent ultrasonic frequencies at key moments to repel pests.

Figure 1:
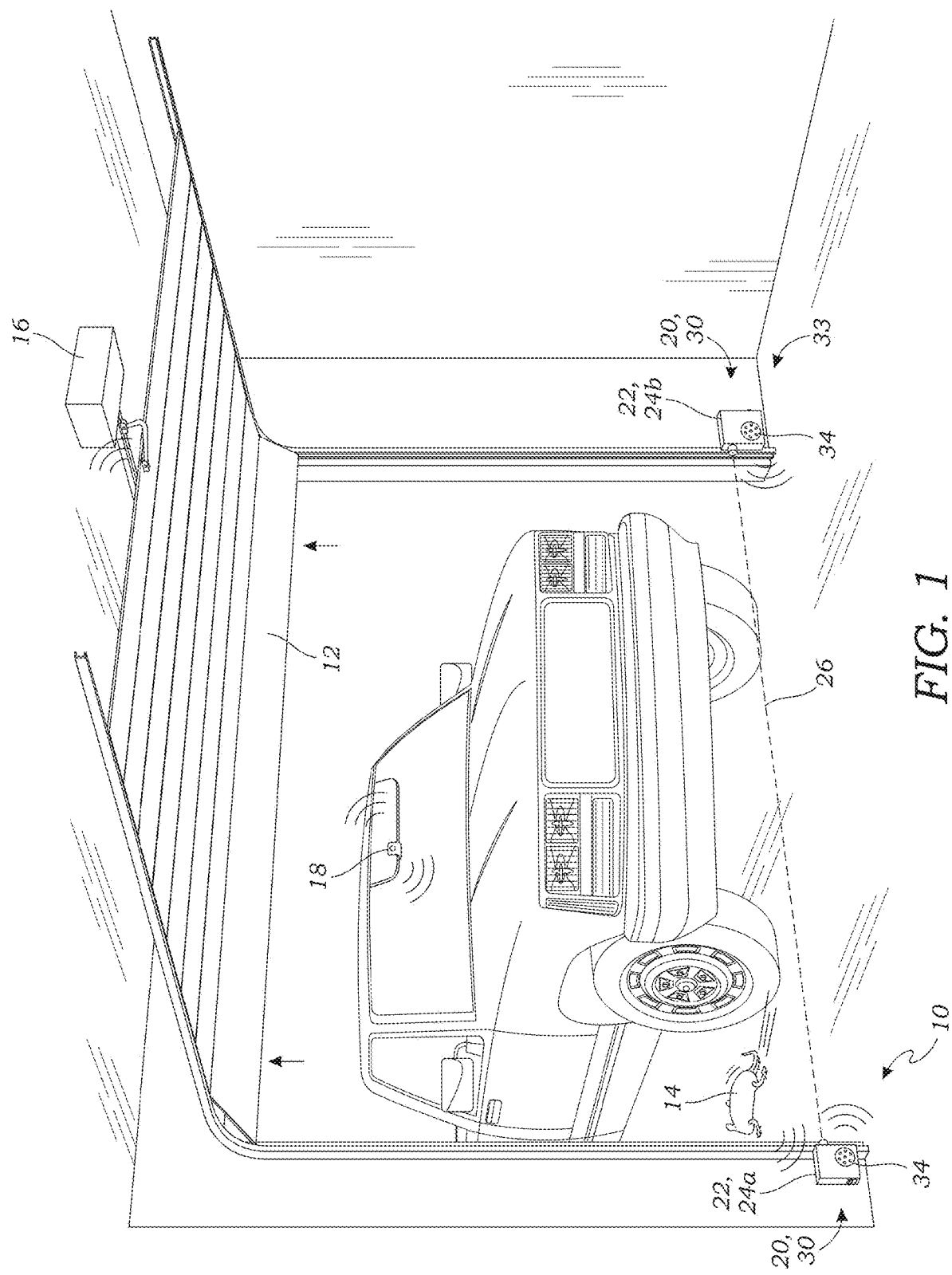
FIG. 1 illustrates a combination garage door sensor and pest repellent device according to one embodiment of the present invention and shown installed in a garage.
Figure 2:
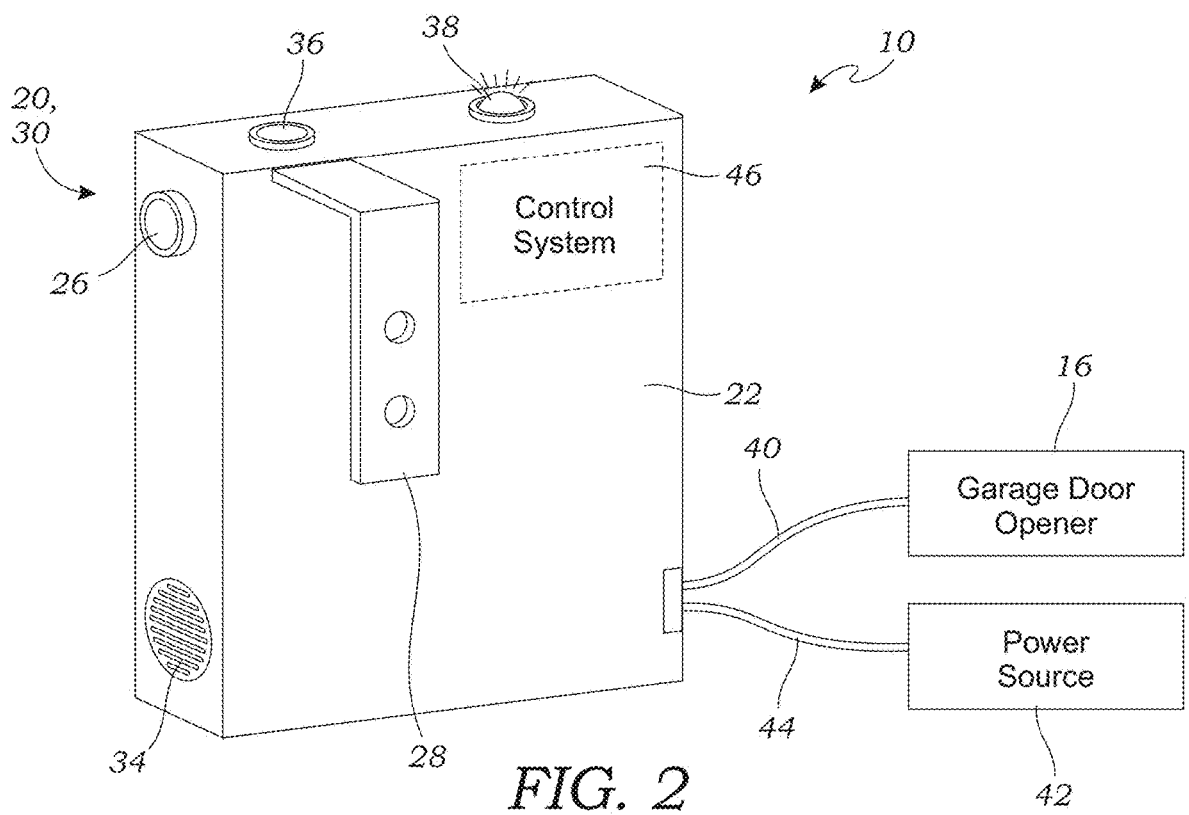
FIG. 2 is a perspective view of the combination, showing a control system.

FIG. 1 illustrates a combination garage door sensor and pest repellent device 10 according to one embodiment of the present invention and shown installed in a garage. FIG. 2 is a perspective view of the combination 10. The combination 10 is adapted for installation adjacent a garage door 12 for repelling pests when the garage door 12 is open. For the purposes of this application, the term "adjacent" is defined to mean a suitable distance for performing the process described below, as determined by the effective repelling distance for the specific pests needing to be deterred.

The combination 10 comprises a garage door sensor 20 and a pest repellent device 30, and the pest repellent device 30 is adapted to emit high-frequency sound waves 33, discussed in greater detail below. Ultrasonic sound waves within a particular range are effective at repelling rodents, cockroaches, ants, bugs, spiders, lepidoptera, termites, and even birds, among other potential pests or unwanted intruders. Certain high-frequency sound waves are inaudible to humans and most pets but highly unsettling to pests. These waves disrupt their communication, feeding patterns, and reproductive cycles, compelling them to flee the affected area. Pests, especially rodents, often wait by a closed garage door in order to dart in as soon as the door is opened. By generating a repellent ultrasonic signal upon opening of the garage door, any nearby pests 14 waiting to enter for food, warmth, shelter, etc., will be repelled by the sudden signal (as shown in FIG. 1). In this manner, pests will also be prevented from acclimating to the signal, as it is not necessarily perpetually operating. In some embodiments, a repellent frequency might also be audible to humans, or the combination 10 may be adapted to switch between sonic and ultrasonic frequencies, which will be decided depending on the particular needs of the consumer.

As shown in FIGS. 1-2, the combination 10 comprises the garage door sensor 20 having a housing 22 that operably mounts a laser or infrared LED 26 for detecting an obstruction at the garage door 12. In this embodiment, the garage door sensor 20 includes a transmitting unit 24a and a receiving unit 24b operably mounted on either side of the garage door opening. The transmitting unit 24a and the receiving unit 24b may operate to transmit and receive infrared or laser beams using the laser/infrared LED 26 and photoresistors (also known as a light-dependent resistors, LDRs, or photo-conductive cells). The transmitter emits an infrared or laser beam across the opening to the receiving unit 24b, creating an invisible infrared/laser line. By detecting interruptions in the beam, the garage door sensor 20 safeguards against accidents by prompting the door to halt or reverse its movement, thus protecting both property and individuals.

As shown in FIG. 1, the garage door 12 may be in the form of a sectional panel door, or any suitable form of garage door, that can be alternately closed and opened using a control mechanism (not shown) which alternately drives the garage door opener 16 (motor) in opposite directions of rotation so that the sectional panel door can be alternately closed and opened. The control mechanism may include, in a typical embodiment, a connection to a switch or the like (not shown) mounted on a wall of the interior of the garage, allowing a person within the garage to instigate either opening or closing motion, as well as a connection to a suitable source of electrical power, such as to a 110-120 volt household circuit, or equivalent, which supplies the required power to operate a garage door opener 16 (motor) and the various circuits included therewithin. In addition to the wall switch, the control mechanism may include a radio receiver which is designed, upon receipt of a coded signal from a remote actuator 18 or the like (normally maintained at a convenient location in a vehicle to allow the driver to send a radio signal), to cause the door to either open or close as desired. All of this is standard in the art, and as these types of technology are well-known, they are not described in further detail herein.

As shown in FIG. 2, the housing 22 further includes a mounting mechanism 28 for mounting the garage door sensor 20 adjacent to the garage door 12, so that the laser/LED/photoreceptor 26 is able to detect an obstruction near or under the garage door 12. In this embodiment, the mounting mechanism 28 is in the form of a bracket, but in other embodiments, any suitable mounting mechanism may be implemented, e.g., rails, a hook and loop fastener, clip, magnets, a shelf, etc., or any other form of mounting mechanism.

Figure 4:
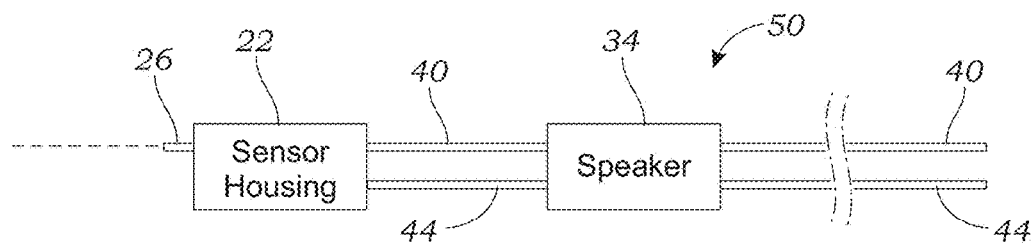
FIG. 4 is a block diagram of a second embodiment of the combination.

The pest repellent device 30 is mounted within or associated with the housing 22 of the sensor device 20. As illustrated, the transmitting unit 24a and the receiving unit 24b may each include the pest repellent device 30, or alternatively only one of the units may include the pest repellent device 30. In the embodiment of FIGS. 1-2, the pest repellent device 30 is mounted within the housing 22 of the garage door sensor 20. An example of the pest repellent device 30 being located outside of the housing 22, but connected with the garage door sensor 20, is shown in FIG. 4 and discussed below.

Figure 3:
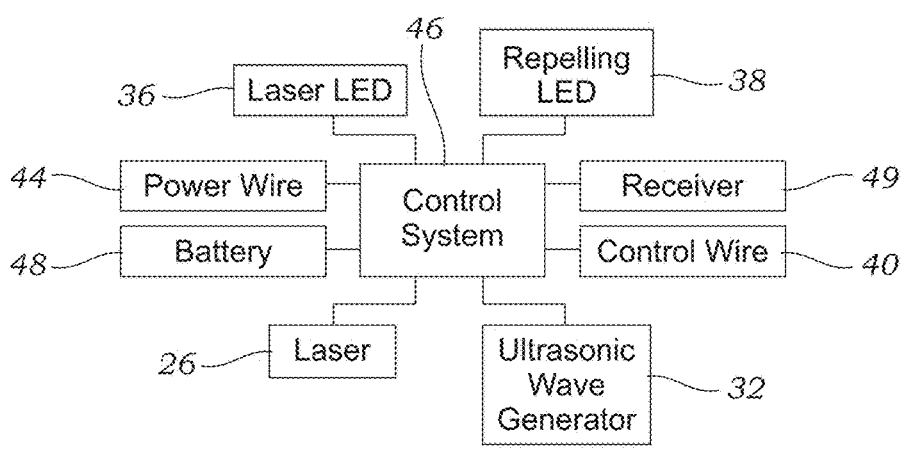
FIG. 3 is a block diagram of the control system.

FIG. 3 is a block diagram of a control system 46 of the combination 10. As shown in FIG. 3, the pest repellent device 30 comprises an ultrasonic wave generator 32 for generating ultrasonic sound waves 33, the ultrasonic wave generator 32 being connected to a speaker 34 or equivalent resonator. In some embodiments, the speaker 34 is in the form of a piezoelectric speaker, which may include a copper plate layer and a piezoelectric ceramic layer, or other similar components.

As shown, in this embodiment, the combination 10 further includes the control system 46 operably installed on an internal processor (not shown), the control system 46 being connected to a laser LED 36 for indicating whether an obstruction is detected (i.e., green for clear, red for obstruction, or similar), and a repelling LED 38 for indicating operation of the speaker 34. A control wire 40 may be connected to the garage door opener 16, and a power wire 44 may be connected to a power source 42 (DC/AC) for powering the garage door sensor 20. In some embodiments, the combination 10 may be adapted for wireless operation, wherein the control system 46 is further or alternatively connected to a battery 48 and a receiver 49 for receiving radio signals and/or internal signals. The receiver 49 may be designed, upon receipt of a coded signal from a remote actuator of the garage door 12, to trigger the ultrasonic high frequency sound, and to stop the sound after the next coded signal is received and the garage door 12 is closed. In various embodiments, all the components of the circuit are placed within the housing unit 22 to prevent exposure to water and humidity.

In use, the control system 46 may first determine if the garage door 12 has been opened, then emit the ultrasonic sound waves 33 via the ultrasonic wave generator 32 when the garage door 12 is opened. When the garage door 12 is closed, the control system 46 halts the ultrasonic sound waves 33. The frequency range of the sound waves may typically be above 20k Hz, or as optimal for repelling the given pest. In some embodiments, the control system 46 may further be equipped with a highly sensitive detection system (not shown) that can identify the presence of pests of various sizes, including tiny ants and larger pests such as rats or possums, etc. If desired, the combination 10 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera), a microphone, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

Other features (not shown) that may be connected to the control system 46 include an on/off switch, a means of preventing supply voltage reversal, a signal ramp generator, a voltage control oscillator, a timer generator and a user switch; said switch for controlling tone and selecting a band of signal frequency being emitted (wherein the frequency may be switchable between ultrasonic and sonic frequencies), a wireless internet module, a display screen, wherein said display screen may include control buttons, and/or a confidence test button for emitting a sonic frequency within human hearing range.

Because the pest repellent device 30 is easy to install and cost-effective to operate, it may be provided at other entry points other than a garage door, i.e., hinged door for humans, pet doors, windows, etc., as long as the ultrasonic sound waves are designed to emit after detection of a closure opening, and halt after the closure has been closed. The pest repellent device 30 may cover a wide range, e.g., up to 800 sq ft, especially as ultrasonic frequencies are capable of passing through walls. In the case of a large structure to be protected, it would be a simple matter to install the device at multiple locations within a single structure. Furthermore, unlike many pest control solutions, the combination 10 is humane, non-toxic, and eco-friendly, so the potential application is not as limiting as those using expensive and hazardous chemicals, traps, etc. In some uses, the pest repellent device 30 may be combined with other pest control methods, such as exclusion, trapping, bait boxes, etc., to maximize effectiveness.

FIG. 4 is a block diagram of a second embodiment of the combination 50. As shown in FIG. 4, in some embodiments, the speaker 34 is positioned outside of the sensor housing 22. In such an embodiment, the control wire 40 and the power wire 44 may connect the sensor housing 22 and the speaker 34, and then connect the speaker 34 or the sensor housing 22 to the garage door opener 16 and power source 42, respectively. Other configurations of the housing 22 and speaker 34 may be possible within the scope of the claims, and the provided illustrations are intended only for the purpose of example.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A combination garage door sensor and pest repellent device for installation adjacent a garage door, the combination comprising:
    a garage door sensor having a housing that operably mounts a laser or infrared LED for detecting an obstruction at the garage door;
    an ultrasonic wave generator for generating ultrasonic sound waves, the ultrasonic wave generator being mounted within or associated with the housing;
    a mounting mechanism for mounting the housing adjacent to the garage door, so that the laser or infrared LED is able to detect an obstruction near or under the garage door;
    a power source for powering the garage door sensor; and
    a control system operably connected with the ultrasonic wave generator for performing the following steps:
    determining if the garage door has been opened;
    emitting the ultrasonic sound waves via the ultrasonic wave generator when the garage door is opened; and
    halting the ultrasonic sound waves when the garage door is closed.

2. The ultrasonic pest repellent device of claim 1, wherein the control system is operably connected to a laser LED for indicating whether an obstruction is indicated under or near the garage door.

3. The ultrasonic pest repellent device of claim 1, wherein the control system is operably connected to a repelling LED for indicating operation of the ultrasonic sound wave generator.

4. The ultrasonic pest repellent device of claim 1, wherein the garage door sensor includes a radio receiver which is designed, upon receipt of a coded signal from a remote actuator of the garage door, to trigger the ultrasonic high frequency sound, and to stop the sound after the next coded signal is received and the garage door is closed.

5. The ultrasonic pest repellent device of claim 1, wherein the transducer means is adapted to switch between ultrasonic and sonic frequencies.

6. The ultrasonic pest repellent device of claim 1, wherein the ultrasonic wave generator is a piezoelectric speaker.

7. The ultrasonic pest repellent device of claim 6, wherein the piezoelectric speaker comprises a copperplate layer and a piezoelectric ceramic layer.

8. The ultrasonic pest repellent device of claim 1, wherein the garage door sensor further comprises a transmitting unit and a receiving unit operably mounted on either side of the garage door opening for transmitting and receiving the laser or infrared LED beam.

* * * * *